US012386246B2

(12) United States Patent
Sheinbaum (10) Patent No.: US 12,386,246 B2
(45) Date of Patent: Aug. 12, 2025

(54) CAMERA COOLING SYSTEM (71) Applicant: JUSTIN SHEINBAUM, DMD, INC., Los Angeles, CA (US)

(72) Inventor: Justin Sheinbaum, Los Angeles, CA (US)

(73) Assignee: Justin Sheinbaum, DMD, Inc., Los Angeles, CA (US)

( * ) Notice: Subject to any disclaimer, the term of this patent is extended or adjusted under 35 U.S.C. 154(b) by 175 days.

(21) Appl. No.: 18/484,301

(22) Filed: Oct. 10, 2023

(65) Prior Publication Data
US 2024/0118595 A1  Apr. 11, 2024

Related U.S. Application Data

(60) Provisional application No. 63/379,134, filed on Oct. 11, 2022.

(51) Int. Cl.
*G03B 17/56* (2021.01)
*F16M 13/04* (2006.01)
*G03B 17/55* (2021.01)

(52) U.S. Cl.
CPC ......... *G03B 17/561* (2013.01); *F16M 13/04* (2013.01); *G03B 17/55* (2013.01); *G03B 2217/007* (2013.01)

(58) Field of Classification Search
CPC . G03B 17/55; G03B 17/56–566; F16M 13/04
See application file for complete search history.

(56) References Cited

FOREIGN PATENT DOCUMENTS

CN    108287446 A  *  7/2018

OTHER PUBLICATIONS

Post titled "I made a 3D printed Fan mount for GoPro! (More info in comments)" by Peaprog, dated Aug. 13, 2022 at <https://www.reddit.com/r/gopro/comments/wnv8u5/i_made_a_3d_printed_fan_mount_for_gopro_more_info/> (Year: 2022).*
NULLcamera, video titled "DIY Gopro air cooling" dated Jun. 4, 2016 posted at <https://www.youtube.com/watch?v=6wYGcmBVr9s>, (Year: 2016).*

* cited by examiner

*Primary Examiner* — Leon W Rhodes, Jr.
(74) *Attorney, Agent, or Firm* — Knobbe, Martens Olson & Bear, LLP (57) ABSTRACT

An action camera headware system is configured to house an action camera actively cooled by a fan of a chassis for head-mounted use. The chassis includes a rigid plate member with cutouts to attach a strap, at least one arm for mounting an action camera, and a fan. The strap further includes a clip with at least one hook to hold auxiliary cables for the fan and the user's action camera. The action camera mounting arm further includes a circular cutout to house a securing device that affixes the action camera's mount to the mount on the chassis, while still allowing the action camera to securely pivot along the longitudinal central axis of the securing device. The fan blows air onto the user's mounted action camera, thus actively cooling the action camera.

20 Claims, 7 Drawing Sheets

CAMERA COOLING SYSTEM

CROSS-REFERENCE TO RELATED APPLICATION

This application claims benefit under 35 U.S.C. 119(e) to U.S. Provisional Patent App. No. 63/379,134, filed Oct. 11, 2022, the entire disclosure of which is hereby incorporated by reference herein in its entirety. Any and all priority claims identified in the Application Data Sheet, or any corrections thereto, are hereby incorporated by reference under 37 CFR 1.57.

TECHNICAL FIELD

This application relates to an active camera cooling system. More specifically, the application relates to a chassis integrating a fan, action camera mount, and headband to prevent overheating while using an action camera for first-person view video capture.

RELATED ART

Action cameras are used by enthusiasts and professionals alike to record high-quality video in dynamic environments at a low cost. There is a need for a product that can both house an action camera and actively cool it while mounted to a user's head for first-person recording.

SUMMARY

An aspect is directed to an action camera headware system, comprising a chassis comprising a rigid plate member, the rigid plate member having a bottom side configured to face a head of a wearer; a top side opposite to the bottom side configured to face away from the head of the wearer; a first lateral edge configured to be aligned with one of a left or a right side of the head of the wearer when the action camera headware system is worn; a second lateral edge configured to be aligned with the other of the left or right side of the head of the wearer when the action camera headware system is worn; a concavity disposed on the bottom side extending from a front of the rigid plate member to a back of the rigid plate member and/or extending from the first lateral edge of the rigid plate member to the second lateral edge of the rigid plate member, such that the concavity generally follows a curvature of the head of the wearer in a sagittal plane and/or in a coronal plane when the action camera headware system is worn; a first lateral opening disposed toward the first lateral edge of the rigid plate member; a second lateral opening disposed toward the second lateral edge of the rigid plate member; a fan mount feature disposed on the top side; an action camera mount feature disposed on the top side forward of the fan mount feature; and a fan comprising a fan housing comprising a front side, a back side, and a fan housing peripheral edge connecting the front side to the back side and extending over a top side and a bottom side of the fan housing; a blade assembly disposed in the fan housing configured to generate airflow when rotated; a fan power cable configured to supply current to the fan; and a fan attachment member disposed on the bottom side of the fan housing peripheral edge, the fan attachment member being coupled to the fan mounting feature; an action camera assembly comprising a camera housing comprising a front side, a back side, and a camera housing peripheral edge connecting the front side to the back side and extending over a top side and a bottom side of the camera housing; an imaging element disposed on or in the camera housing and facing the front side; a camera attachment member disposed on the bottom side of the camera housing peripheral edge of the camera housing, the camera attachment member being coupled to the action camera mount feature; and a camera power cable configured to supply current to the camera; a resilient support having a circumferential portion and a top portion, the circumferential portion configured to pass through the first lateral opening, along the bottom of the rigid plate member and through the second lateral opening, the top portion configured to span between two points of the circumferential portion, the resilient support having an inward facing side and an outward facing side; and a plurality of cable routing clips secured to the outward facing side of the resilient support, a first routing clip of the plurality of cable routing clips supporting the camera power cable and a second routing clip of the plurality of cable routing clips supporting the fan power cable; wherein the resilient support is configured such that the inward facing side can be placed over a head of users of various sizes while supporting the weight of the action camera headware system in use; and wherein an area within the fan housing peripheral edge is no greater than an area within the camera housing peripheral edge such that substantially all airflow generated by the fan impinges upon the back side of the camera.

An aspect is directed to an action camera headware system, comprising a chassis comprising a concave rigid plate member, the concave rigid plate member having a fan mount feature disposed on a top side of the concave rigid plate member; an action camera mount feature disposed on the top side forward of the fan mount feature; and a fan attached to the fan mount feature, the fan comprising a fan housing comprising a fan housing peripheral edge; an action camera assembly coupled to the action camera mount feature, the action camera comprising a camera housing comprising a front side, a back side, and a camera housing peripheral edge connecting the front side to the back side and extending over a top side and a bottom side of the camera housing; and an imaging element disposed on or in the camera housing and facing the front side; and a resilient support assembly configured to support the action camera, chassis and a power cable for powering the fan or the camera; and wherein an area within the fan housing peripheral edge is no greater than an area within the camera housing peripheral edge such that substantially all airflow generated by the fan impinges upon the back side of the camera.

A variation of the above aspect is, a chassis configured to be worn on a head of a user, comprising a rigid plate member sized and shaped to complement a shape of the head of the user; at least one mounting arm configured to support an action camera; a fan oriented to blow air onto an area in which the action camera is mounted; and at least one cutout sized and shaped to receive a strap configured to be worn around the head of the user.

A variation of the above aspect is, wherein the fan is pivotally supported by the rigid plate member.

A variation of the above aspect is, wherein the fan is capable of variable spinning speeds.

A variation of the above aspect is, wherein the fan comprises a housing and fan blades, the housing covering the fan blades and having one or more windows to facilitate airflow from an intake side of the fan to an exhaust side of the fan, the housing being configured to attach to the rigid plate member.

A variation of the above aspect is, wherein the rigid plate member is capable of being worn by the user in at least one orientation on the head of the user.

A variation of the above aspect is, further comprising a pin configured to couple the action camera to the at least one mounting arm.

A variation of the above aspect is, wherein the action camera is configured to pivot along a central longitudinal axis of the pin.

A variation of the above aspect is, wherein the fan is disposed behind the at least one mounting arm.

A variation of the above aspect is, wherein the fan is powered by an auxiliary battery.

A variation of the above aspect is, wherein the at least one cutout is integrated into the rigid plate member.

A variation of the above aspect is, wherein the at least one cutout is configured to accommodate the strap.

A variation of the above aspect is, wherein the strap is adjustable to accommodate variable head sizes of users.

A variation of the above aspect is, wherein the strap is configured to pass through the at least one cutout of the chassis.

A variation of the above aspect is, wherein the strap supports the weight of the chassis while the chassis is worn by the user.

A variation of the above aspect is, wherein the chassis and/or strap comprises at least one clip.

A variation of the above aspect is, wherein the at least one clip comprises at least one hook.

A variation of the above aspect is, wherein the at least one clip is configured to secure one or more cables.

An aspect is directed to a method for cooling an action camera mounted to a wearable chassis, the method comprising providing a fan and a rigid plate member both supported by the wearable chassis, the rigid plate member being configured to support the action camera; and positioning the fan and/or the action camera so as to blow air onto or away from the action camera.

A variation of the above aspect is, wherein the fan is pivotally supported by the rigid plate member.

A variation of the above aspect is, wherein the fan is capable of variable spinning speeds.

A variation of the above aspect is, wherein the fan comprises a housing and fan blades, the housing covering the fan blades and having one or more windows to facilitate airflow from an intake side of the fan to an exhaust side of the fan, the housing being configured to attach to the rigid plate member.

A variation of the above aspect is, wherein the rigid plate member is capable of being worn by the user in at least one orientation on the head of the user.

A variation of the above aspect is, further comprising a pin configured to couple the action camera to the at least one mounting arm.

A variation of the above aspect is, wherein the action camera is configured to pivot along a central longitudinal axis of the pin.

A variation of the above aspect is, wherein the fan is disposed behind the at least one mounting arm.

A variation of the above aspect is, wherein the fan is powered by an auxiliary battery.

A variation of the above aspect is, wherein the at least one cutout is integrated into the rigid plate member.

A variation of the above aspect is, wherein the at least one cutout is configured to accommodate the strap.

A variation of the above aspect is, wherein the strap is adjustable to accommodate variable head sizes of users.

A variation of the above aspect is, wherein the strap is configured to pass through the at least one cutout of the chassis.

A variation of the above aspect is, wherein the strap supports the weight of the chassis while the chassis is worn by the user.

A variation of the above aspect is, wherein the chassis and/or strap comprises at least one clip.

A variation of the above aspect is, wherein the at least one clip comprises at least one hook.

A variation of the above aspect is, wherein the at least one clip is configured to secure one or more cables.

A variation of the above aspect is, a method for cooling an action camera mounted to a wearable chassis, the method comprising providing a fan and a rigid plate member both supported by the wearable chassis, the rigid plate member being configured to support the action camera; and positioning the fan and/or the action camera so as to blow air onto or away from the action camera.

An aspect is directed to an action camera headware system comprising a chassis configured to be worn on the head of a user. The chassis comprises a rigid plate member, a fan, and an action camera mount configured to support an action camera.

A variation of the above aspect is, wherein the chassis can be worn by a user on other parts of their body.

A variation of the above aspect further comprises a strap configured to support the rigid plate member relative to the head of the user.

A variation of the above aspect is, wherein the rigid plate member comprises at least one cutout or other opening, the at least one cutout or opening being sized and shaped to receive at least a portion of the strap.

A variation of the above aspect is, wherein the at least one cutout is an extension of the rigid plate member.

A variation of the above aspect is, wherein the strap is integrated into the chassis and there may be cutouts or other openings to receive a strap.

A variation of the above aspect further comprises at least one clip, the at least one clip being configured to secure one or more cables to the strap.

A variation of the above aspect is, wherein the at least one clip is attached to the chassis.

A variation of the above aspect is, wherein the at least one clip is independent of the rigid plate member.

A variation of the above aspect is, wherein the at least one clip is hook-like and/or comprises at least one hook.

A variation of the above aspect is, wherein the at least one clip is clamp-like or otherwise applies pressure to the at least one cable to secure it in place.

A variation of the above aspect is, wherein the at least one clip friction-fits to at least one wire.

A variation of the above aspect is, the at least one clip comprises a cylindrical hole through which at least one cable can be directed or threaded.

A variation of the above aspect is, the at least one clip is any device that keeps the at least one cable from interrupting a user's actions, the camera's ability to record video or sound, or the operation of the fan.

A variation of the above aspect is, wherein the strap is a cloth belt.

A variation of the above aspect is, wherein the strap is comprised of at least one loop.

A variation of the above aspect is, wherein the strap is made from any material that attaches to the chassis and holds the chassis to a user's head.

A variation of the above aspect is, wherein the clip comprises at least one hook, clamp, or aperture for threading configured to secure the one or more cables to the strap.

A variation of the above aspect is, wherein the fan is pivotally supported by the rigid plate member.

A variation of the above aspect is, wherein the fan can rotate relative to at least the X, Y, and Z axis.

A variation of the above aspect is, wherein the fan can be linearly adjusted along at least the X, Y, and Z axis.

A variation of the above aspect is, wherein the fan is adjustable on at least a rail system.

A variation of the above aspect is, wherein the fan is adjustable on at least a telescopic system.

A variation of the above aspect is, wherein the fan is adjustable on at least a rotary system.

A variation of the above aspect is, wherein the fan is adjustable on at least a magnetic system.

A variation of the above aspect is, wherein the fan is adjustable on at least a system comprising at least one adjustable arm or pivoting element.

A variation of the above aspect is, wherein the fan comprises a housing and fan blades, the housing covering the fan blades and having one or more windows to facilitate airflow from an intake side of the fan to an exhaust side of the fan, the housing being configured to attach to the rigid plate member.

A variation of the above aspect is, wherein the fan is bladeless.

A variation of the above aspect is, wherein the fan comprises an impeller-driven airflow system.

A variation of the above aspect is, wherein the fan comprises a turbine.

A variation of the above aspect is, wherein the fan comprises a Venturi through which air is forced.

A variation of the above aspect is, wherein the fan element is a cooling element, wherein the cooling element comprises cooling fins, a heat sink, a liquid cooling system, a ventilation system, an evaporative cooling system, a heat pump system, an air conditioning system, or any combination thereof.

A variation of the above aspect is, wherein the fan is powered by an auxiliary battery.

A variation of the of the above aspect is, wherein the fan is powered by an auxiliary source.

A variation of the above aspect is, wherein the action camera mount is supported by the rigid plate member and comprises one or more arms, the one or more arms being configured to attach to the action camera.

A variation of the above aspect is, wherein the arms are rigidly affixed to the rigid plate member and an integral part of the chassis.

A variation of the above aspect is, wherein the arms are adjustable and moveable.

A variation of the above aspect is, wherein the arms are not an integral part of the chassis.

A variation of the above aspect further comprises a pin configured to engage the one or more arms and the action camera such that the action camera is attached to the arms by the pin, wherein the one or more arms are configured to allow the action camera to pivot along at least the central longitudinal axis of the pin.

An aspect is directed to cooling the camera to increase the longevity of the camera or one or more batteries powering the camera.

An aspect is directed to cooling the camera to increase the camera's audio and video recording times.

An aspect is directed to cooling the camera to prevent the camera from overheating.

An aspect is directed to cooling the camera to by blowing air forward onto the camera. A variation of the above aspect is, wherein the camera is cooled by not blowing air forward on to the camera, e.g., by drawing air that is warmer than the ambient air due to proximity to the camera away from the camera thereby to replace the warmer air with ambient air.

An aspect is directed to a method for cooling an action camera mounted to a wearable chassis, the method comprises providing a fan and a rigid plate member both supported by the wearable chassis, the rigid plate member being configured to support the action camera and positioning the fan and/or the action camera so as to blow air onto or away from the action camera.

An aspect is directed to a chassis configured to house an action camera actively cooled by a fan of the chassis for head-mounted use. The chassis includes a rigid plate member with at least one cutout to attach a strap, at least one arm for mounting an action camera, a pin to secure the camera to the rigid plate member, at least one clip to secure at least one wire, and a fan. The clip further includes at least one hook to hold auxiliary cables for the fan and the user's action camera. Each rigid plate member mounting arm further includes a circular cutout to house a securing device that affixes the action camera's mounting arms to the chassis, while still allowing the action camera to securely pivot along the longitudinal central axis of the securing device. The fan further includes a fan housing with cutouts to facilitate airflow from the intake side to the exhaust side of the fan, a fan with blades or vanes attached to a central hub, and an electric motor that activates the central hub that is powered by an auxiliary power source. The fan blows air onto the user's mounted action camera, thus actively cooling the action camera.

A variation of the above aspect is, wherein the rigid plate member has cutouts for weight saving.

A variation of the above aspect is, wherein the rigid plate member is curved to ergonomically compliment a user's forehead.

A variation of the above aspect is, wherein the rigid plate member is curved to ergonomically complement a user's crown.

A variation of the above aspect is, wherein the rigid plate member is curved to ergonomically complement the side of a user's head.

A variation of the above aspect is, wherein the rigid plate member is curved to ergonomically complement the sides of a user's head.

A variation of the above aspect is, wherein the rigid plate member is curved to ergonomically complement the back of a user's head.

A variation of the above aspect is, wherein the clip comprises two hooks for action camera and fan auxiliary cables.

A variation of the above aspect is, wherein the auxiliary cable clip is a clamp mounted to the strap.

A variation of the above aspect is, wherein the chassis comprises a plurality of action camera mounting arms each oriented so the cutouts of each align to accommodate a securing device, wherein the securing device tessellates with the cutouts of the camera and rigid plate member mounting arms, wherein the securing device holds the camera in place when the securing device is inserted through at least one mounting arm of the rigid plate member and at least one mounting arm of the camera.

A variation of the above aspect is, wherein at least one of the action camera mounting arms allows the user to lock in the place the position of the attached action camera.

A variation of the above aspect is, wherein the securing device allows the user to lock in place the position of the action camera attached to the action camera mounting arm(s) of the chassis.

A variation of the above aspect is, wherein the fan can change direction of airflow to draw hot air away from the user's action camera.

A variation of the above aspect is, wherein the fan and rigid plate member comprise one integrated unit.

A variation of the above aspect is, wherein the fan, rigid plate member, and mounting arms comprise one integrated unit.

A variation of the above aspect is, wherein the fan, rigid plate member, mounting arms, and clip comprise one integrated unit.

A variation of the above aspect is, wherein the fan is secured to not pivot.

A variation of the above aspect is, wherein the fan is secured to not move along any axes.

A variation of the above aspect is, wherein the fan can pivot relative to its point of attachment with the rigid plate member to compliment the angle of the user's action camera.

A variation of the above aspect is, wherein the fan can pivot left and right on the chassis.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will not be described with additional specificity and detail through use of the accompanying drawings.

DETAILED DESCRIPTION

The following detailed description is directed to certain specific embodiments. The invention(s) disclosed herein, however, can be embodied in a multitude of different ways as defined and covered by the claims. In this description, reference is made to the drawings, wherein like parts are designated with like numerals throughout. The features, aspects and advantages of the present invention will now be described with reference to the drawings of several embodiments that are intended to be within the scope of the development herein disclosed. These and other embodiments will become readily apparent to those skilled in the art from the following detailed description of the embodiments having reference to the attached figures, the invention not being limited to any particular embodiment(s) herein disclosed.

Figure 1:
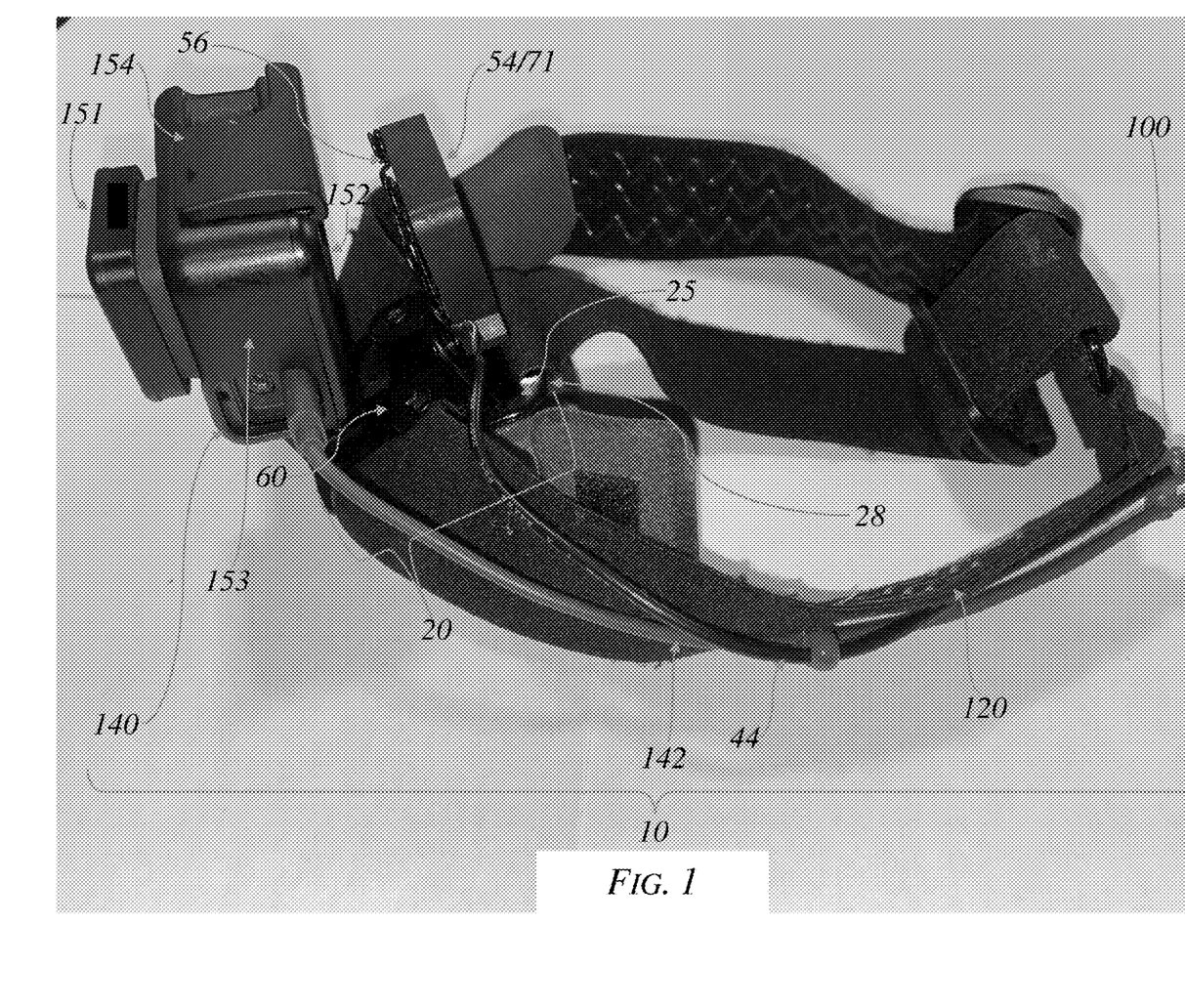
FIG. 1 is a perspective side view of an action camera headware system including a chassis comprising a camera cooling system according to an embodiment of the disclosure.

FIG. 1 is a side view of a chassis 20 with an action camera member 140 and strap 120 attached. In certain embodiments, the rigid plate member 60 has a bottom side 21 configured to face the head of a wearer. In certain embodiments, the rigid plate member 60 has a top side 22 opposite to the bottom side 21 configured to face away from the head of the wearer. In certain embodiments, the rigid plate member 60 has a plurality of lateral edges. In certain embodiments, the rigid plate member 60 has a first lateral edge 23 configured to be aligned with one of a left or a right side of the wearer's head when the action camera headware system 10 is worn by the wearer. In certain embodiments, the rigid plate member 60 has a second lateral edge 24 configured to be aligned with the other of the left or right side of the wearer's head when the action camera headware system 10 is worn. In certain embodiments, the rigid plate member 60 has a concavity 26 disposed on its bottom side 21 extending from a front 27 of the rigid plate member 60 to a back 28 of the rigid plate member and/or extending from the first lateral edge 23 of the rigid plate member to the second lateral edge 24 of the rigid plate member, such that the concavity 26 generally follows a curvature of the wearer's head in a sagittal plane and/or coronal plane when the action camera headware system 10 is worn. In certain embodiments, the rigid plate member 60 has a first lateral opening 29 disposed toward the first lateral edge 23 of the rigid plate member. In certain embodiments, the rigid plate member 60 has a second lateral opening 30 disposed toward the second lateral edge 24 of the rigid plate member. In certain embodiments, the rigid plate member 60 has a plurality of lateral openings. In certain embodiments, the rigid plate member 60 has at least one cutout. In certain embodiments, the strap 120 loops through cutouts 25 in the rigid plate member 60 on a plurality of sides. In certain embodiments, the strap 120 is belt-like in configuration and operation. In certain embodiments, the rigid plate member 60 has cutouts 25 on all sides of the rigid plate member 60. In certain embodiments, the rigid plate member 60 has no cutouts with the strap 120 being integrally attached to the rigid plate member 60. The cutouts 25 allow the user to attach a strap 120 to the chassis 20 to wear it on the user's head in various orientations or on other parts of the body. In certain embodiments, the strap 120 is made from a fabric material. In certain embodiments, the strap 120 has pads for extra support, sweat mitigation, improved fit to the user, and/or added user comfort. In certain embodiments, the strap 120 is adjustable. In certain embodiments, the strap 120 is configured to have the clip 100 attached to it.

In certain embodiments, the strap 120 is a resilient support that has a circumferential portion configured to pass through the first lateral opening 29 of the rigid plate member and the top portion configured to span between two points of the circumferential portion. In certain embodiments, the resilient support has an inward-facing side that faces the user's head and an outward-facing side facing away from the user's head. In certain embodiments, the resilient support has a plurality of cable routing clips secured to the outward-facing side of the resilient support, with a first routing clip of the plurality of cable routing clips supporting the camera power cable and a second routing clip of the plurality of cable routing clips supporting the fan power cable. In certain embodiments, the resilient support is configured such that the inward-facing side can be placed over various sizes of human heads (who are the wearer of the headware system) while supporting the weight of the action camera headware system 10 in use. In certain embodiments, the area within the fan housing peripheral edge is no greater than an area within the camera housing peripheral edge such that substantially all airflow generated by the fan member impinges upon the back side of the camera.

Figure 2:
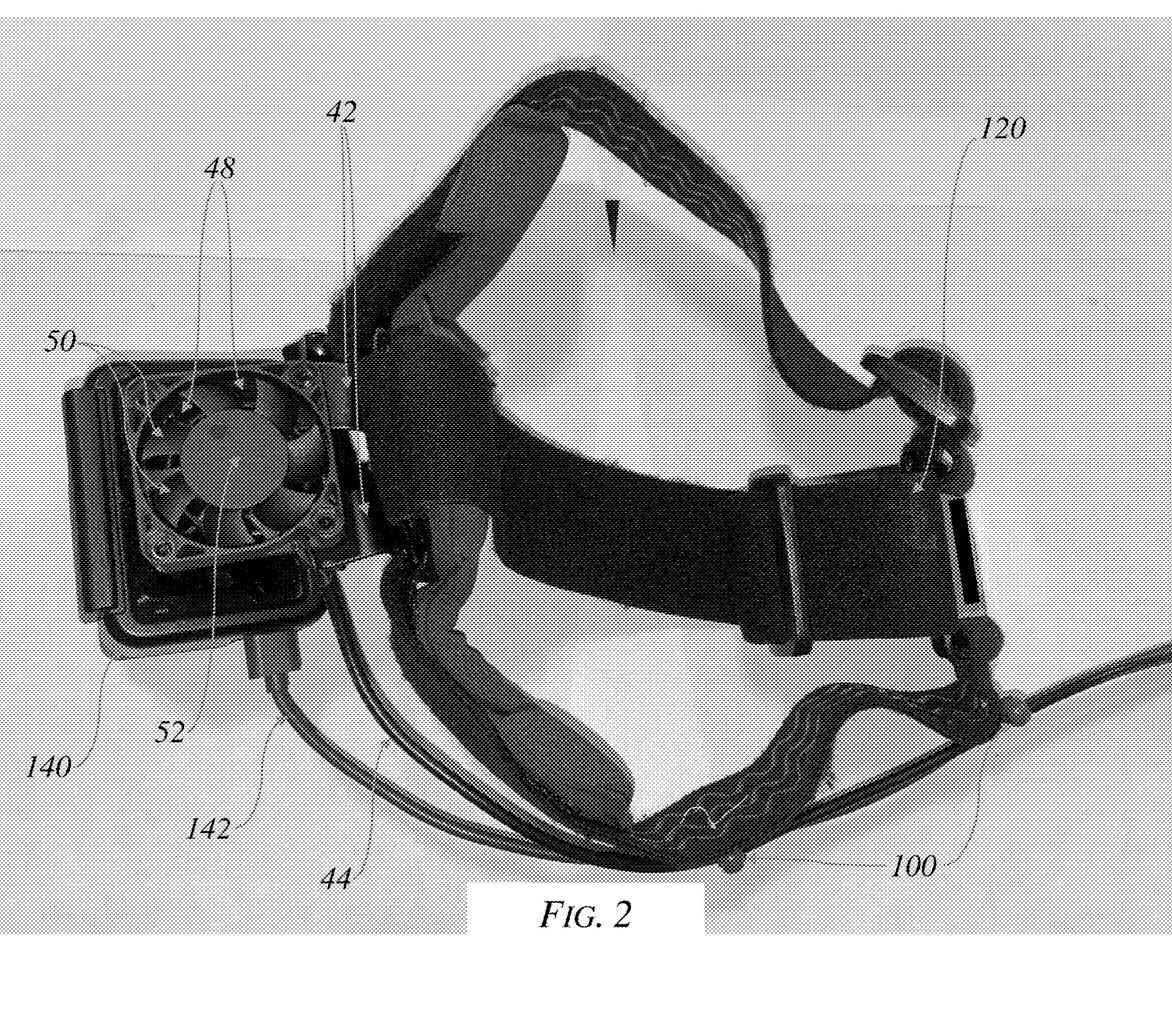
FIG. 2 is a back view of the system of FIG. 1 including a view of the chassis and showing a fan.

FIG. 2 is a rear-facing view of the fan 40. In certain embodiments, the fan 40 comprises a front side, a back side, and a fan housing peripheral edge that connects the front side to the back side and extends over a top side and a bottom side of the fan housing 46. In some embodiments, the fan 40 comprises a plurality of sides that connect to each other and enclose a blade assembly 50. In certain embodiments, a blade assembly In certain embodiments, the fan 40 is attached via brackets 42 to the rigid plate member 60, which together comprise the fan mount feature 41. In certain embodiments, the fan mount feature 41 is any rigid or adjustable or removeable feature that secures the fan to the rigid plate member 60. In certain embodiments, the fan 40 is attached by a hinge so the angle of the fan can be adjusted by the user. In certain embodiments, the fan 40 is disposed on the top side 22 of the rigid plate member 60. In certain embodiments, the fan 40 can horizontally pivot left or right. In certain embodiments, the fan 40 can be adjusted along at least the X, Y, and Z axes. In certain embodiments, the fan 40 can rotate along at least the X, Y, and Z axes. In certain embodiments, the fan 40 is fully integrated with the rigid plate member 60. In certain embodiments, the fan 40 can be removed from the rigid plate member 40. In certain embodiments, the fan 40 cannot be adjusted. In certain embodiments, the fan can be adjusted or pivoted along at least the X, Y, and Z axes with a telescopic, rail, magnetic, rotary, or pivoting/moveable arm system. Pivoting the fan 40 allows the user to angle the fan 40 to match the angle of the camera 140, thus ensuring the full amount of wind generated by the fan 40 is blown onto or away from the user's action camera 140. In certain embodiments, the action camera housing 150 comprises a front side 151, a back side 152, and a camera housing peripheral edge 153 connecting the front side 151 to the back side 152 and extending over a top side 154 and a bottom side 155 of the camera housing. In certain embodiments, the action camera member 140 is any kind of imaging element. In certain embodiments, the imaging element faces the front side of rigid plate member 60. In certain embodiments, the fan speed is capable of adjustment by the user to produce different variable speeds. In certain embodiments, the action camera member 140 has a camera attachment member 156 disposed on the bottom side 155 of the camera housing peripheral edge 153 of the camera's housing 150, the camera attachment member 156 being coupled to the action camera mount feature 78. In certain embodiments, the camera attachment member 156 is any rigid and/or adjustable structure integrated with or independent but attached to the camera housing peripheral edge 153 that is capable of or configured to couple to action camera mount feature 78. The action camera member is distinct from and is not an augmented reality member or virtual reality member. In certain embodiments, the action camera 140 is disposed on the action camera headware system 10 such that it is on top of the user's head. The action camera 140 can be out of the user's line of sight. By placing the action camera 140 out of sight, the user can perform any actions that require or benefit from an unrestricted view. For example, the action camera headware system 10 could be used by surgeons while operating to enable them to capture live video for intraoperative video streams or for archival records. By configuring the action camera headware system 10 to position the action camera 140 out of the field of view, the surgeon can operate unrestricted by the camera. The action camera headware system 10 is coupled with an action camera that captures video and in some cases audio and video but without requiring the generation of any displays for the user. By providing for capture of video and in some cases audio and video, the action camera headware system 10 can operate for longer periods of time on the same size or smaller batteries and/or while generating less heat than in full augmented reality or virtual reality systems which may have cameras but also require much more complex componentry. The action camera 140 can capture video images that are not displayed real time to the user. By operating images without requiring simultaneous display, the action camera 140 can be smaller, generate less head and/or operate for a longer period with less battery.

In certain embodiments, the fan 40 is integrated with the rigid plate member 60, such that the rigid plate member 60 and fan housing 46 comprise one unit. In the primary embodiment, the intake 54 and exhaust sides 56 of the fan housing 46 comprise a square shape with rounded corners. In certain embodiments, the intake 54 and exhaust sides 56 of the fan housing 46 are circular, semicircular, square, hexagonal, or any other shape. In certain embodiments, the fan 40 can be any cooling element, such as cooling fins, a heat sink, a liquid cooling system, a ventilation system, an evaporative cooling system, a heat pump system, an air conditioning system, or any combination thereof. In certain embodiments, the fan 40 is bladeless. In certain embodiments, the fan 40 is any impeller-driven airflow system. In certain embodiments, the fan 40 is a turbine. In certain embodiments, the fan 40 comprises a Venturi through which air is forced. In certain embodiments, the fan 40 is oriented on top of, to either side of, under, or in front of the camera member 140. In certain embodiments, there is a plurality of fans. In certain embodiments, the action camera mount feature 78 is disposed on the top side 22 of the rigid plate member 60 forward of the fan mount feature 41.

Figure 3:
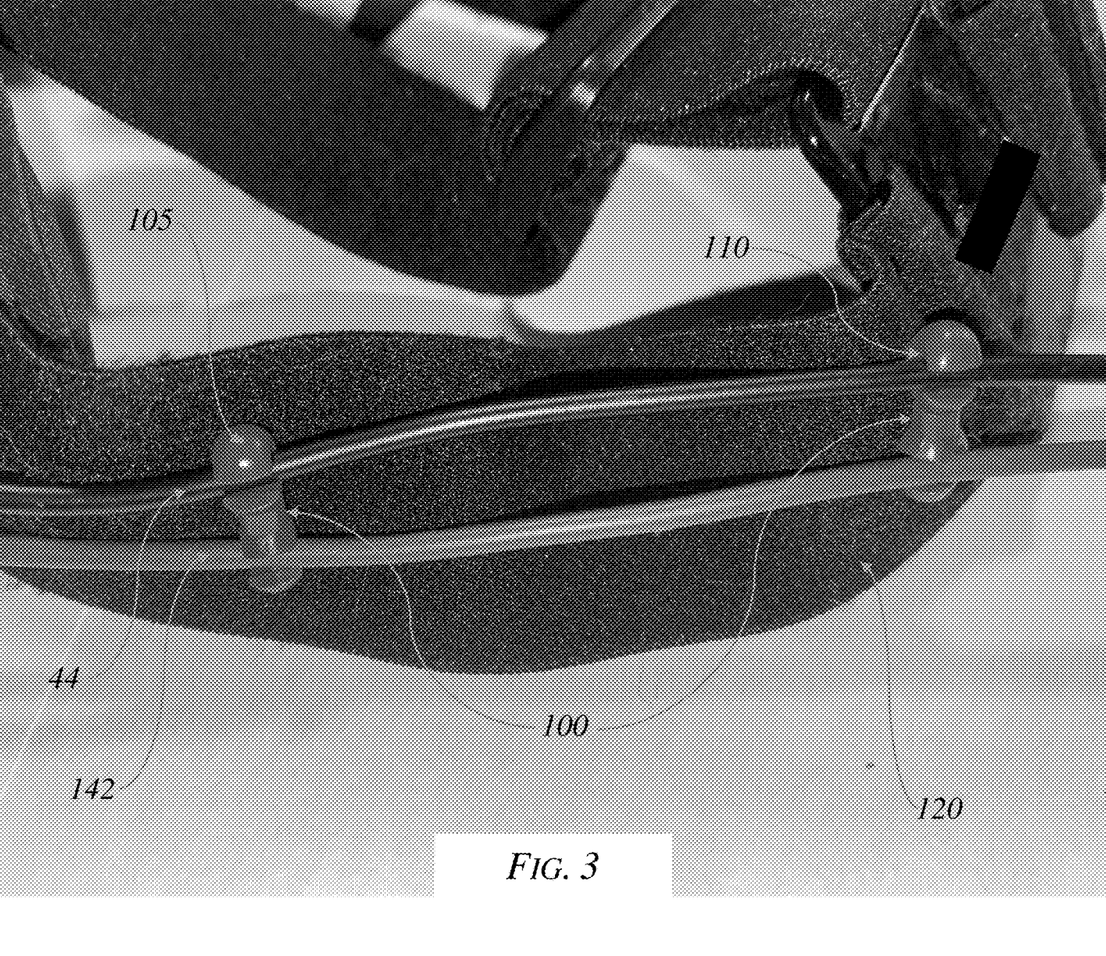
FIG. 3 is a view of strap-mounted clips for routing cables of the camera and the fan along a headband of the action camera headware system to or from the vicinity of the chassis.

FIG. 3 is a view of one or more clips 100 mounted to the strap 120. In certain embodiments, the strap 120 comprises at least one clip 100, each clip 100 having at least one hook 105. In certain embodiments, the hook opening 110 is sized to accommodate the auxiliary cables for the fan 44 and action camera 142. In certain embodiments, the clip 100 has two hooks 105 to accommodate two cables. In certain embodiments, the clip 100 clamps onto the cables to keep them in place. In certain embodiments the at least one clip 100 operates with a friction fit mechanism to hold at least one cable in place. In certain embodiments, the at least one clip 100 is a cylindrical hole through which at least one cable can be held in place. In certain embodiments, the at least one clip 100 is any device that keeps at least one cable from interrupting a user's actions, the camera's ability to record video or sound, or the fan's ability to operate. Connecting the auxiliary cables 44, 142 to the clip 100 allows the user to neatly keep the cables together to minimize the potential for tangling or catching the cables on anything. In certain embodiments, the at least one clip 100 is integrated with the rigid plate member 60. In certain embodiments, a camera power cable is configured to supply current to the camera member 140.

Figure 4:
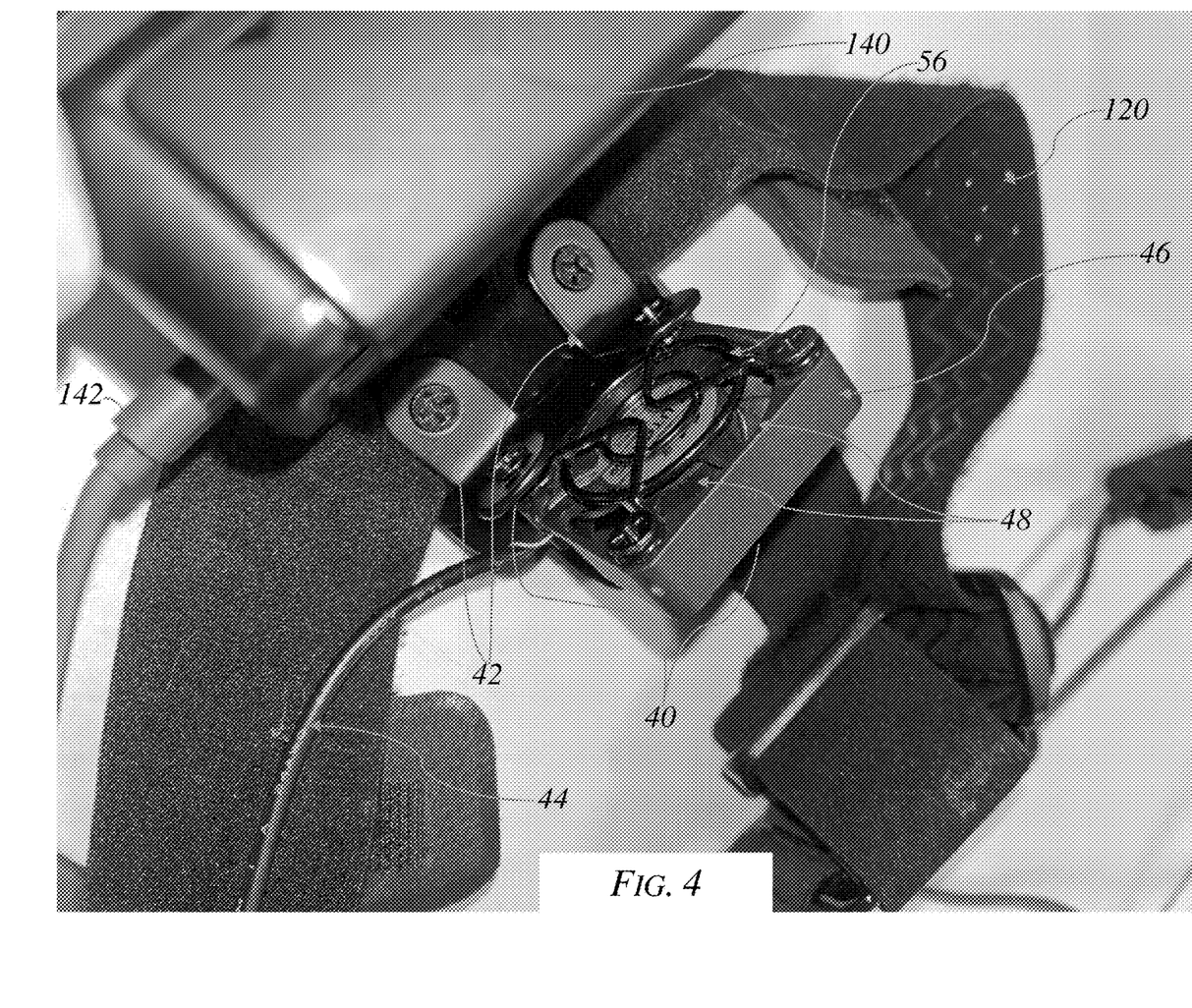
FIG. 4 is a top view of the chassis with the camera and the strap attached, showing the strap looped through a rigid plate member of the chassis.

FIG. 4 is a top-down view of the chassis 20 with the action camera 140 and the strap 120 attached. In the illustrated embodiment, the fan 40 is configured to blow air onto the action camera 140 mounted to the chassis 20. In certain embodiments, the fan blades/blade assembly 50 blow air away from the action camera 140 to draw in air that surrounds the action camera 140. The fan housing 46 comprises cutouts 48 at the intake 54 and exhaust sides 56 of the fan 40 facilitating airflow through the fan 40 when the fan 40 is powered on.

In the illustrated embodiment, the fan 40 comprises: a fan housing 46; a set of blades or vanes 50 attached to a central hub 52. In certain embodiments, the central hub 52 acts as an impeller by spinning centrifugally about its central axis. In certain embodiments, the central hub 52 is activated by an electric motor. In certain embodiments, the electric motor is powered by an auxiliary power source connected to the motor by auxiliary cable 44. In the illustrated embodiment, the motor spins in such a direction as to direct air onto the action camera 140. In certain embodiments, the user can select the direction the electric motor spins, thus changing the direction of airflow through the fan 40. In certain embodiments, the fan housing 46 comprises a front side 70, a back side 71, and a fan housing peripheral edge 72 connecting the front side 70 to the back side 71 and extending over a top 73 side and a bottom side 74 of the fan housing 46.

The chassis 20 can comprise metal, plastic, or any other material that is rigid and durable. The rigid plate member 60 of the chassis 20 can be rectangular, circular, trapezoidal, triangular, or any other shape for its largest surface. The rigid plate member 60 is thin in profile and can be curved in one or more dimensions to complement the shape of a human forehead or crown. In certain embodiments, the rigid plate member 60 has cutouts to save weight for enhanced wearability. The integration of the action camera mount 78 into the chassis is a durable solution that minimizes the risk of the action camera 140 or a third-party mount disconnecting during use.

Figure 5A:
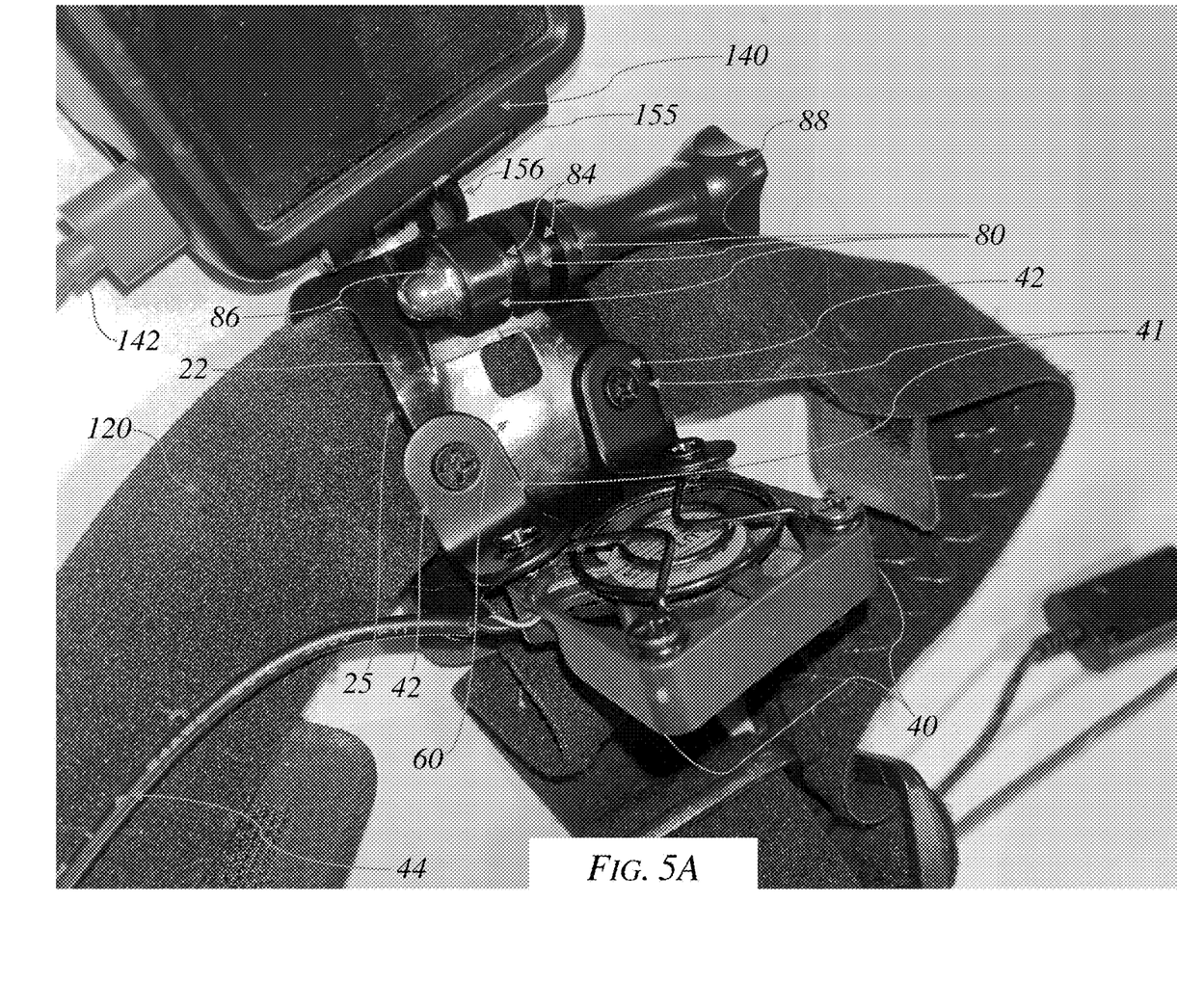
FIG. 5A is a top view of the chassis with the camera disconnected from the camera mount.
Figure 5B:
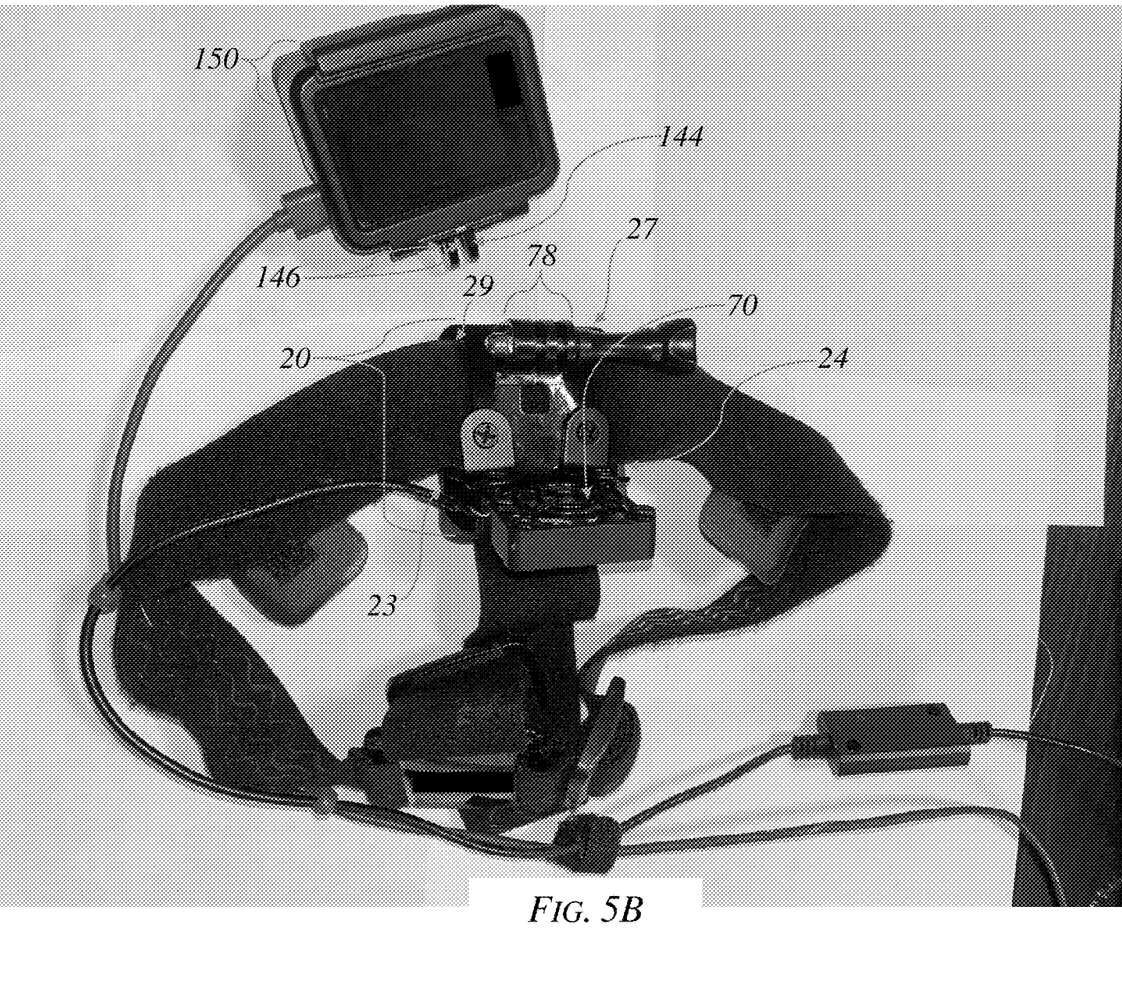
FIG. 5B is a zoomed-out top view of the action camera headware system of FIG. 1 including the chassis as depicted in FIG. 5A with the camera separated from the chassis.

FIG. 5A is a top-down view of the chassis 20. In certain embodiments, integrated with the rigid plate member 60 are the one or more arms 80 comprising the action camera mount 78. In certain embodiments, each action camera mounting arm 80 (sometimes, "arm" or "arms") extends from the rigid plate member 60. In certain embodiments, each action camera mounting arm 80 has a circular cutout 82 through which a pin, screw, bolt, fastener, or other securing device 84 can fit. FIG. 5B is a top-down view of the chassis 20 and the action camera 140 detached to show the action camera's mount 144. In certain embodiments, each circular cutout 82 is a distance from the distal end of the arm 80 (i.e., the end farthest from the arm's attachment to the rigid plate member) sufficient to accommodate attaching to the action camera's mount 144 such that the distal end of the arm 80 does not touch the action camera 140 when the camera 140 is pivoted to any position while attached to the arm(s) 80. In certain embodiments, the chassis 20 comprises a plurality of action camera mounting arms 80 wherein each arm 80 is identical. In embodiments where the chassis 20 comprises a plurality of action camera mounting arms 80, the arms 80 are aligned according to their circular cutouts 82 and spaced from each other to accommodate the mount of an action camera 144. In the illustrated embodiment, each action camera mounting arm 80 has a side profile shape comprising a rectangle with a semicircle on top of the rectangle. In certain embodiments, the action camera mounting arm 80 has a side profile shape that is triangular, rectangular, pentagonal, elliptical, or any other shape. In certain embodiments, at least one arm 80 can lock the action camera 140 in place while mounted to the chassis 20.

Figure 6:
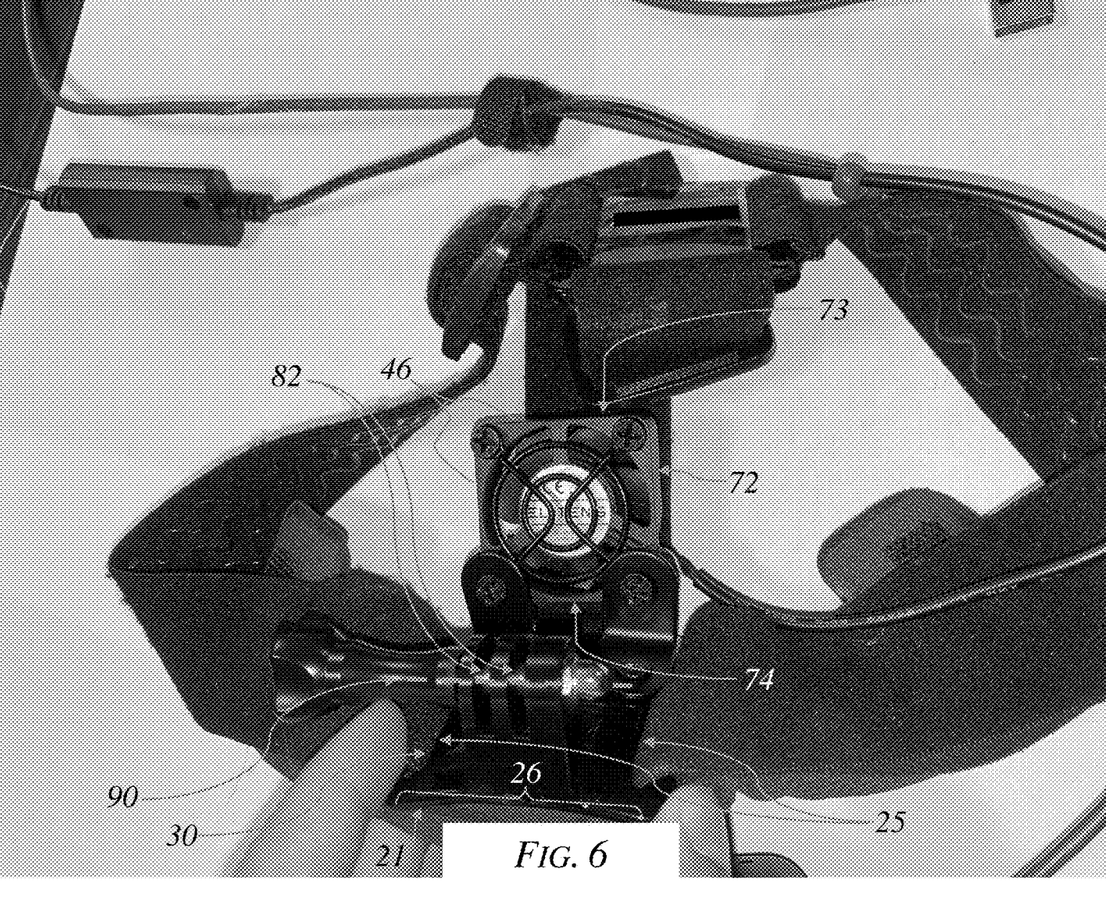
FIG. 6 is a front view of the chassis with the camera removed.

FIG. 6 shows the action camera mount 144 in detail from its front view. In certain embodiments, each pin, screw, bolt, fastener, or other securing device 84 for the cutout 82 of each action camera mounting arm 80 securely fits through the hole 146 of an action camera's mount 144 such that the camera 140 does not easily pivot along the longitudinal central axis 90 of the securing device 84 thus ensuring the camera 140 remains in place. The securing device 84 can comprise plastic, metal, or any other material. In certain embodiments, the securing device 84 can lock the action camera 140 in place. In certain embodiments, one end of the securing device 84 is threaded to accommodate a screw cap 88. In certain embodiments, one end of the securing device 84 is flanged 86 to prevent it from sliding through the cutouts 82.

Terminology

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described above. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

For expository purposes, the term "horizontal" as used herein is defined as a plane parallel to the plane or surface of the floor or ground of the area in which the device being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

What is claimed is:

1. An action camera headware system, comprising:
a chassis comprising:
a rigid plate member, the rigid plate member having:
a bottom side configured to face a head of a wearer;
a top side opposite to the bottom side configured to face away from the head of the wearer;
a first lateral edge configured to be aligned with one of a left or a right side of the head of the wearer when the action camera headware system is worn;
a second lateral edge configured to be aligned with the other of the left or right side of the head of the wearer when the action camera headware system is worn;
a concavity disposed on the bottom side extending from a front of the rigid plate member to a back of the rigid plate member and/or extending from the first lateral edge of the rigid plate member to the second lateral edge of the rigid plate member, such that the concavity generally follows a curvature of the head of the wearer in a sagittal plane and/or in a coronal plane when the action camera headware system is worn;
a first lateral opening disposed toward the first lateral edge of the rigid plate member;
a second lateral opening disposed toward the second lateral edge of the rigid plate member;
a fan mount feature disposed on the top side;
an action camera mount feature disposed on the top side forward of the fan mount feature; and
a fan comprising:
a fan housing comprising a front side, a back side, and a fan housing peripheral edge connecting the front side to the back side and extending over a top side and a bottom side of the fan housing;

a blade assembly disposed in the fan housing configured to generate airflow when rotated;

a fan power cable configured to supply current to the fan; and a fan attachment member disposed on the bottom side of the fan housing peripheral edge, the fan attachment member being coupled to the fan mounting feature;

an action camera assembly comprising:

a camera housing comprising a front side, a back side, and a camera housing peripheral edge connecting the front side to the back side and extending over a top side and a bottom side of the camera housing;

an imaging element disposed on or in the camera housing and facing the front side;

a camera attachment member disposed on the bottom side of the camera housing peripheral edge of the camera housing, the camera attachment member being coupled to the action camera mount feature; and a camera power cable configured to supply current to the camera;

a resilient support having a circumferential portion and a top portion, the circumferential portion configured to pass through the first lateral opening, along the bottom of the rigid plate member and through the second lateral opening, the top portion configured to span between two points of the circumferential portion, the resilient support having an inward facing side and an outward facing side; and a plurality of cable routing clips secured to the outward facing side of the resilient support, a first routing clip of the plurality of cable routing clips supporting the camera power cable and a second routing clip of the plurality of cable routing clips supporting the fan power cable;

wherein the resilient support is configured such that the inward facing side can be placed over a head of users of various sizes while supporting the weight of the action camera headware system in use; and wherein an area within the fan housing peripheral edge is no greater than an area within the camera housing peripheral edge such that substantially all airflow generated by the fan impinges upon the back side of the camera.

2. An action camera headware system, comprising:

a chassis comprising:

a concave rigid plate member, the concave rigid plate member having:

a fan mount feature disposed on a top side of the concave rigid plate member;

an action camera mount feature disposed on the top side forward of the fan mount feature; and a fan attached to the fan mount feature, the fan comprising a fan housing comprising a fan housing peripheral edge;

an action camera assembly coupled to the action camera mount feature, the action camera comprising:

a camera housing comprising a front side, a back side, and a camera housing peripheral edge connecting the front side to the back side and extending over a top side and a bottom side of the camera housing; and an imaging element disposed on or in the camera housing and facing the front side; and a resilient support assembly configured to support the action camera, chassis and a power cable for powering the fan or the camera; and wherein an area within the fan housing peripheral edge is no greater than an area within the camera housing peripheral edge such that substantially all airflow generated by the fan impinges upon the back side of the camera.

3. A chassis configured to be worn on a head of a user, comprising:

a rigid plate member sized and shaped to complement a shape of the head of the user;

at least one mounting arm on the rigid plate member, configured to support an action camera;

a fan connected to the rigid plate member and oriented to blow air onto an area in which the action camera is mounted; and at least one cutout sized and shaped to receive a strap configured to be worn around the head of the user.

4. The chassis of claim 3, wherein the fan is pivotally supported by the rigid plate member.

5. The chassis of claim 3, wherein the fan is capable of variable spinning speeds.

6. The chassis of claim 3, wherein the fan comprises a housing and fan blades, the housing covering the fan blades and having one or more windows to facilitate airflow from an intake side of the fan to an exhaust side of the fan, the housing being configured to attach to the rigid plate member.

7. The chassis of claim 3, wherein the rigid plate member is capable of being worn by the user in at least one orientation on the head of the user.

8. The chassis of claim 3, further comprising a pin configured to couple the action camera to the at least one mounting arm.

9. The chassis of claim 8, wherein the action camera is configured to pivot along a central longitudinal axis of the pin.

10. The chassis of claim 3, wherein the fan is disposed behind the at least one mounting arm.

11. The chassis of claim 3, wherein the fan is powered by an auxiliary battery.

12. The chassis of claim 3, wherein the at least one cutout is integrated into the rigid plate member.

13. The chassis of claim 3, wherein the at least one cutout is configured to accommodate the strap.

14. The chassis of claim 3, wherein the strap is adjustable to accommodate variable head sizes of users.

15. The chassis of claim 3, wherein the strap is configured to pass through the at least one cutout of the chassis.

16. The chassis of claim 3, wherein the strap supports the weight of the chassis while the chassis is worn by the user.

17. The chassis of claim 3, wherein the chassis and/or strap comprises at least one clip.

18. The chassis of claim 17, wherein the at least one clip comprises at least one hook.

19. The chassis of claim 17, wherein the at least one clip is configured to secure one or more cables.

20. A method for cooling an action camera mounted to a wearable chassis, the method comprising:

providing a rigid plate member supported by the wearable chassis, the rigid plate member having a mounting arm configured to support the action camera and a connected fan capable of blowing air; and positioning the fan and/or the action camera so as to blow air onto or away from the action camera.

* * * * *